United States Patent
Takehara et al.

(10) Patent No.: US 12,354,429 B2
(45) Date of Patent: Jul. 8, 2025

(54) OPTICAL SENSOR, PAPER SHEET IDENTIFICATION DEVICE, PAPER SHEET PROCESSING DEVICE, AND LIGHT DETECTION METHOD

(71) Applicant: Glory Ltd., Himeji (JP)

(72) Inventors: Daiki Takehara, Himeji (JP); Naoki Ueyama, Himeji (JP)

(73) Assignee: GLORY LTD., Himeji (JP)

( * ) Notice: Subject to any disclaimer, the term of this patent is extended or adjusted under 35 U.S.C. 154(b) by 153 days.

(21) Appl. No.: 18/196,442

(22) Filed: May 12, 2023

(65) Prior Publication Data

US 2023/0282053 A1 Sep. 7, 2023

Related U.S. Application Data

(63) Continuation of application No. PCT/JP2021/041020, filed on Nov. 8, 2021.

(30) Foreign Application Priority Data

Nov. 16, 2020 (JP) .................... 2020-190305

(51) Int. Cl.
G07D 7/12 (2016.01)
G01N 21/27 (2006.01)
(Continued)

(52) U.S. Cl.
CPC ............. G07D 7/12 (2013.01); G01N 21/27 (2013.01); G01N 21/645 (2013.01); G06V 10/56 (2022.01)

(58) Field of Classification Search
CPC ...... G01N 21/25; G01N 21/255; G01N 21/27; G01N 21/274; G01N 21/62; G01N 21/64;
(Continued)

(56) References Cited

U.S. PATENT DOCUMENTS 7,256,874 B2 * 8/2007 Csulits .................... G07D 7/12
382/181
8,446,470 B2 * 5/2013 Lu .......................... H04N 23/45
348/148
(Continued)

FOREIGN PATENT DOCUMENTS

EP 3 389 251 A1 10/2018
JP H09-305820 A 11/1997
(Continued)

OTHER PUBLICATIONS

International Search Report and Written Opinion mailed on Jan. 25, 2022, received for PCT Application PCT/JP2021/041020, filed on Nov. 8, 2021, 9 pages including English Translation.

*Primary Examiner* — John R Lee
(74) *Attorney, Agent, or Firm* — XSENSUS LLP

(57) ABSTRACT

An optical sensor of the present disclosure detects light from a sheet on which is printed at least one type of single-color ink among n types of single-color inks, the optical sensor including: a light source; a light receiver including first to (n−1)th light-receiving elements; a memory configured to store a correction value based on reference data obtained by receiving lights emitted from the first to n-th single-color inks individually in the light receiver by type of single-color inks; and a controller configured to correct detection data with the correction value, the detection data obtained by receiving, in the light receiver, light emitted from a sheet irradiated with light from the light source.

8 Claims, 8 Drawing Sheets

(51) Int. Cl.
*G01N 21/64* (2006.01)
*G06V 10/56* (2022.01)

(58) Field of Classification Search
CPC .. G01N 21/645; G01N 21/6454; G01V 10/40; G01V 10/50; G01V 10/56; G07D 7/06; G07D 7/12; G07D 7/1205; G07D 7/121; H04N 1/60; H04N 1/6002; H04N 1/6005; H04N 1/6008; H04N 23/84; H04N 23/85
See application file for complete search history.

(56) References Cited

U.S. PATENT DOCUMENTS

| | | | | |
|---|---|---|---|---|
| 9,672,678 | B2* | 6/2017 | Gao | H04N 23/11 |
| 10,564,038 | B2* | 2/2020 | Taneda | G01N 21/251 |
| 10,627,638 | B2* | 4/2020 | Chen | G02B 27/1066 |
| 10,638,060 | B2* | 4/2020 | Liu | H04N 23/11 |
| 10,666,927 | B2* | 5/2020 | Bendall | G01N 21/954 |
| 10,677,646 | B2* | 6/2020 | Bogaki | G01J 1/0437 |
| 11,140,370 | B2* | 10/2021 | Tsukada | H04N 23/21 |
| 11,265,490 | B2* | 3/2022 | Romanenko | G06T 5/50 |
| 11,375,137 | B2* | 6/2022 | Okuike | H04N 9/646 |
| 11,430,234 | B2* | 8/2022 | Bergqvist | G06V 40/40 |
| 11,592,679 | B2* | 2/2023 | Chen | G02B 27/16 |
| 11,906,356 | B2* | 2/2024 | Koike | G01N 21/251 |
| 2017/0180683 | A1 | 6/2017 | Won et al. | |
| 2017/0191946 | A1 | 7/2017 | Smith et al. | |
| 2017/0374299 | A1* | 12/2017 | Liu | H04N 1/6008 |
| 2018/0373049 | A1* | 12/2018 | Chen | G02B 5/20 |
| 2019/0208146 | A1* | 7/2019 | Tsukada | H04N 23/843 |
| 2019/0230254 | A1* | 7/2019 | Taneda | G01J 3/524 |
| 2019/0250040 | A1* | 8/2019 | Taneda | G01J 3/0202 |
| 2020/0007694 | A1* | 1/2020 | Kubota | H04N 1/00023 |
| 2020/0111277 | A1 | 4/2020 | Clark | |
| 2020/0300701 | A1* | 9/2020 | Taneda | G01J 3/2803 |
| 2021/0112223 | A1* | 4/2021 | Tsukada | H04N 25/131 |
| 2023/0015962 | A1 | 1/2023 | Ueyama et al. | |
| 2023/0106354 | A1* | 4/2023 | Koike | H04N 1/00793 356/300 |
| 2023/0273448 | A1* | 8/2023 | Chen | G02B 27/14 359/629 |
| 2023/0282053 | A1* | 9/2023 | Takehara | G07D 7/12 356/71 |

FOREIGN PATENT DOCUMENTS

| | | |
|---|---|---|
| JP | 2006-240097 A | 9/2006 |
| JP | 2008-243098 A | 10/2008 |
| JP | 2016-009445 A | 1/2016 |
| JP | 6469370 B2 | 2/2019 |
| JP | 2021-149833 A | 9/2021 |

* cited by examiner

OPTICAL SENSOR, PAPER SHEET IDENTIFICATION DEVICE, PAPER SHEET PROCESSING DEVICE, AND LIGHT DETECTION METHOD

CROSS-REFERENCE TO RELATED APPLICATIONS

The present application is a Continuation Application of PCT Application No. PCT/JP2021/041020 filed on Nov. 8, 2021, which claims priority to Japanese Patent Application No. 2020-190305 filed on Nov. 16, 2020 under the Paris Convention and provisions of national law in a designated State. The entire contents of the application are hereby incorporated by reference.

TECHNICAL FIELD

The present disclosure relates to optical sensors, sheet recognition units, sheet handling devices, and light detection methods. The present disclosure more specifically relates to an optical sensor, a sheet recognition unit, a sheet handling device, and a light detection method that can detect at least one single-color ink printed on a sheet.

BACKGROUND

Banknote recognition units are currently used for recognition of the denomination, authenticity, fitness, serial number, and/or other properties of banknotes. For example, an image of a banknote captured by an optical line sensor installed in a banknote recognition unit is analyzed to recognize the denomination of a banknote, the authenticity of a banknote, the fitness of a banknote, the 35 characters of the serial number on a banknote, and/or other properties of a banknote.

Techniques lately developed along with the increase in security elements on a banknote include a technique of generating a plurality of images related to a plurality of lights having different wavelength bands. For example, JP 6469370 B discloses an optical line sensor device including a light-receiving unit with linearly arranged four light-receiving elements per pixel, wherein the four light-receiving elements are a light-receiving element covered with a red color filter, a light-receiving element covered with a green color filter, a light-receiving element covered with a blue color filter, and a light-receiving element covered with an infrared color filter.

SUMMARY

The present disclosure is directed to an optical sensor that detects light from a sheet on which is printed at least one type of single-color ink among first to n-th n types of single-color inks that emit lights having wavelength bands different from one another, wherein n is an integer of 3 or greater, the optical sensor including: a light source; a light receiver including first to (n−1)th light-receiving elements respectively capable of selectively receiving lights emitted from the first to (n−1)th single-color inks among the first to n-th single-color inks and capable of receiving light emitted from the n-th single-color ink; a memory configured to store a correction value based on reference data obtained by receiving lights emitted from the first to n-th single-color inks individually in the light receiver by type of single-color inks; and a controller configured to correct detection data with the correction value, the detection data obtained by receiving, in the light receiver, light emitted from a sheet irradiated with light from the light source.

DETAILED DESCRIPTION

Figure 1:
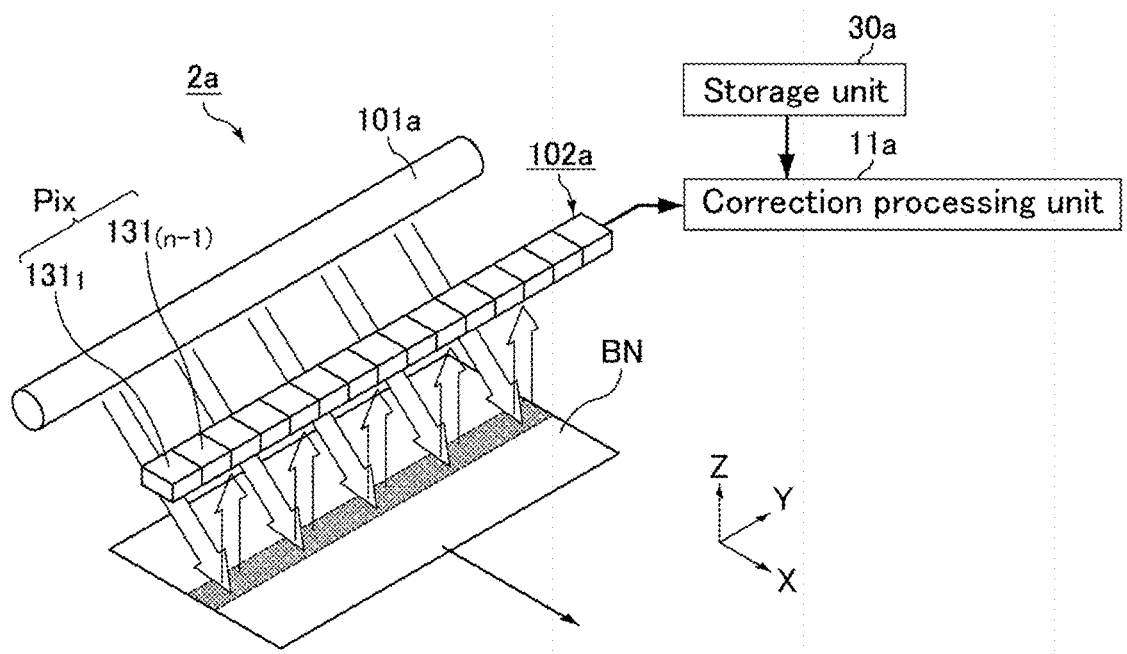
FIG. 1 is a schematic perspective view showing the structure of an optical sensor of Embodiment 1.

Security inks that emit phosphorescence and/or fluorescence have been developed as inks used for sheets. Examples of the security inks include single-color inks such as a red ink that emits red light, a green ink that emits green light, a blue ink that emits blue light, and an infrared ink that emits infrared light. Considerations have been made for configuring a conventional optical sensor to further have a function of detecting single-color light emitted from each single-color ink or mixed-color light emitted from a combination ink of two or more single-color inks.

A conventional optical sensor includes, for example, three types of light-receiving elements, namely a red light-receiving element in which a color resist pattern selectively transmitting red light is formed on a light-receiving element, a green light-receiving element in which a color resist pattern selectively transmitting green light is formed on a light-receiving element, and a blue light-receiving element in which a color resist pattern selectively transmitting blue light is formed on a light-receiving element. These color resist patterns, however, usually transmit infrared light, meaning that the red light-receiving element, the green light-receiving element, and the blue light-receiving element unavoidably receive infrared light in addition to red light, green light, and blue light, respectively. Such an optical sensor is thus unusable in recognizing infrared light emitted from an infrared ink.

Such a problem may possibly be solved by, for example, further forming an infrared cut filter on each of the red light-receiving element and the green light-receiving element while allowing the blue light-receiving element to detect infrared light. However, as being capable of simultaneously detecting blue light and infrared light, the blue light-receiving element cannot distinguish between blue light and infrared light. Also, the additional infrared cut filters increase the cost.

Another possible method is to add a light-receiving element selectively receiving infrared light as in JP 6469370 B. This method, too, however, increases the cost.

In response to the above current state of the art, an object of the present disclosure is to provide an optical sensor, a sheet recognition unit, a sheet handling device, and a light detection method that can recognize light emitted from a single-color ink and having a wavelength band receivable in light-receiving elements of different colors, without use of a light-receiving element capable of selectively receiving light having the above wavelength band.

(1) In order to solve the above issue and to achieve the object, one aspect of the present disclosure is directed to an optical sensor that detects light from a sheet on which is printed at least one type of single-color ink among first to n-th n types of single-color inks that emit lights having wavelength bands different from one another, wherein n is an integer of 3 or greater, the optical sensor including: a light source; a light receiver including first to (n−1)th light-receiving elements respectively capable of selectively receiving lights emitted from the first to (n−1)th single-color inks among the first to n-th single-color inks and capable of receiving light emitted from the n-th single-color ink; a memory configured to store a correction value based on reference data obtained by receiving lights emitted from the first to n-th single-color inks individually in the light receiver by type of single-color inks; and a controller configured to correct detection data with the correction value, the detection data obtained by receiving, in the light receiver, light emitted from a sheet irradiated with light from the light source.

(2) In the optical sensor of (1) above, the correction value may be based on a matrix A with n rows and n columns represented by the following Formula (1):

$$A = \begin{bmatrix} A_{11} & \cdots & A_{1n} \\ \vdots & \ddots & \vdots \\ A_{(n-1)1} & \cdots & A_{(n-1)n} \\ \sum_{i=1}^{n-1} A_{i1} & \cdots & \sum_{i=1}^{n-1} A_{in} \end{bmatrix} \quad \text{Formula (1)}$$

wherein a matrix element $A_{xy}$ is an output value of an x-th light-receiving element when light emitted from a y-th single-color ink among the first to n-th single-color inks is received alone in the light receiver, where x is an integer of 1 or greater and (n−1) or smaller and y is an integer of 1 or greater and n or smaller.

(3) In the optical sensor of (2) above, the correction value may be based on a normalized matrix of the matrix A represented by the Formula (1).

(4) In the optical sensor of (3) above, the correction value may be based on an inverse matrix of the normalized matrix.

(5) In the optical sensor of (3) or (4) above, the normalized matrix may be obtained by calculation including dividing each matrix element in a y-th column of the matrix A by a matrix element in a y-th row and the y-th column of the matrix A.

(6) In the optical sensor of any one of (1) to (5) above, n may be 4, light emitted from a first single-color ink may have a peak wavelength of 400 nm or longer and shorter than 500 nm, light emitted from a second single-color ink may have a peak wavelength of 500 nm or longer and shorter than 600 nm, light emitted from a third single-color ink may have a peak wavelength of 600 nm or longer and shorter than 750 nm, and light emitted from a fourth single-color ink may have a peak wavelength of 750 nm or longer and shorter than 2500 nm.

(7) A second aspect of the present disclosure is directed to a sheet recognition unit including the optical sensor according to any one of (1) to (6) above.

(8) A third aspect of the present disclosure is directed to a sheet handling device including the sheet recognition unit of (7) above.

(9) A fourth aspect of the present disclosure is directed to a light detection method of detecting light from a sheet on which is printed at least one type of single-color ink among first to n-th n types of single-color inks that emit lights having wavelength bands different from one another, wherein n is an integer of 3 or greater, the method including: a detection step of obtaining detection data by receiving light emitted from a sheet irradiated with light from a light source in a light receiver including first to (n−1)th light-receiving elements respectively capable of selectively receiving lights emitted from the first to (n−1)th single-color inks among the first to n-th single-color inks and capable of receiving light emitted from the n-th single-color ink; and a correction step of correcting the detection data with a correction value based on reference data obtained by receiving lights emitted from the first to n-th single-color inks individually in the light receiver by type of single-color inks.

(10) In the light detection method of (9) above, the correction value may be based on a matrix A with n rows and n columns represented by the Formula (1).

(11) In the light detection method of (10) above, the correction value may be based on a normalized matrix of the matrix A represented by the Formula (1).

(12) In the light detection method of (11) above, the correction value may be based on an inverse matrix of the normalized matrix.

(13) In the light detection method of (11) or (12) above, the normalized matrix may be obtained by calculation including dividing each matrix element in a y-th column of the matrix A by a matrix element in a y-th row and the y-th column of the matrix A.

(14) In the light detection method of any one of (9) to (13) above, n may be 4, light emitted from a first single-color ink may have a peak wavelength of 400 nm or longer and shorter than 500 nm, light emitted from a second single-color ink may have a peak wavelength of 500 nm or longer and shorter than 600 nm, light emitted from a third single-color ink may have a peak wavelength of 600 nm or longer and shorter than 750 nm, and light emitted from a fourth single-color ink may have a peak wavelength of 750 nm or longer and shorter than 2500 nm.

The optical sensor, the sheet recognition unit, the sheet handling device, and the light detection method of the present disclosure can recognize light emitted from a single-color ink and having a wavelength band receivable in light-receiving elements of different colors, without use of a light-receiving element capable of selectively receiving light having the above wavelength band.

Hereinafter, embodiments of an optical sensor, a sheet recognition unit, a sheet handling device, and a light detection method of the present disclosure are described with reference to the drawings. Various objects are applicable as the objects in the present disclosure. Devices for sheets as the objects are used hereinbelow as examples to describe the present disclosure. Various sheets such as banknotes, checks, vouchers, bills, business forms, documents of value, and card-like media are applicable as sheets used in the present disclosure. Devices for banknotes are used hereinbelow as examples to describe the present disclosure. Also, the following describes the cases where the optical sensor of the present disclosure has the function of an optical line sensor in which pixels each including a plurality of light receiving elements are arranged in the main scanning direction. The same components or components having similar functions in the following description are commonly assigned with the same reference sign throughout the drawings as appropriate, and description thereof is omitted as appropriate. Drawings showing a structure appropriately include the XYZ coordinate system where the XYZ axes are perpendicular to one another.

Herein, a phosphorescence image means an image based on the intensity distribution of phosphorescence emitted from an object when the object is irradiated with excitation light. A reflection image means an image based on the intensity distribution of light reflected by an object when the object is irradiated with light. A transmission image is an image based on the intensity distribution of light transmitted through an object when the object is irradiated with light.

Embodiment 1

An optical sensor and a light detection method of the present embodiment detect light from a banknote on which is printed at least one type of single-color ink among first to n-th n types of single-color inks that emit lights having wavelength bands different from one another, where n is an integer of 3 or greater (the same applies hereinbelow).

The n types of single-color inks that emit lights having wavelength bands different from one another may be n types of inks selected from a plurality of types of inks that emit lights of different colors within the visible light range, inks that emit infrared light, and inks that emit ultraviolet light. Examples of the plurality of types of single-color inks that emit lights of different colors within the visible light range include a blue ink that emits blue light having a peak wavelength of 400 nm or longer and shorter than 500 nm, a green ink that emits green light having a peak wavelength of 500 nm or longer and shorter than 600 nm, and a red ink that emits red light having a peak wavelength of 600 nm or longer and shorter than 750 nm. Examples of the inks that emit infrared light include an infrared ink that emits light having a peak wavelength of 750 nm or longer and shorter than 2500 nm. Examples of the inks that emit ultraviolet light include an ultraviolet ink that emits light having a peak wavelength of 200 nm or longer and shorter than 400 nm. The peak wavelength is the wavelength where the emission intensity of light is maximum.

The at least one type of single-color ink printed on a banknote is not limited and may include an n-th single-color ink.

Lights emitted from first to n-th single-color inks may each include one or both of phosphorescence and fluorescence that are emitted from the ink when the ink is irradiated with excitation light. In the present embodiment, phosphorescence or fluorescence from a banknote may be detected or both phosphorescence and fluorescence from a banknote may be detected.

The structure of the optical sensor of the present embodiment is described with reference to FIG. 1. As shown in FIG. 1, an optical sensor $2a$ of the present embodiment includes a light source $101a$, a light-receiving unit (light receiver) $102a$, a storage unit (memory) $30a$, and a correction processing unit $11a$.

A banknote BN may be transported in the X direction in the XY plane. In this case, the Y direction may correspond to the main scanning direction of the optical sensor $2a$. The X direction may correspond to the sub-scanning direction of the optical sensor $2a$.

The light source $101a$ irradiates the banknote BN with irradiation light. The optical sensor $2a$ may include the light source $101a$ on the same side as the light-receiving unit $102a$ relative to the banknote BN as shown in FIG. 1. The light source $101a$ may emit irradiation light such that the banknote BN is irradiated in a range that extends linearly in the Y direction (main scanning direction).

The light source $101a$ and the light-receiving unit $102a$ may extend throughout a transport path in a banknote handling device, in which the optical sensor $2a$ is to be installed, in a width direction of the transport path. The optical sensor $2a$ may function as an optical line sensor that acquires optical data (optical characteristics) on a banknote BN throughout the transport path in the width direction of the transport path.

The type of irradiation light emitted from the light source $101a$ is not limited. The light source $101a$ may emit excitation light having a predetermined wavelength band as irradiation light. Non-limiting examples of the excitation light include visible light, ultraviolet light, and infrared light.

The light-receiving unit $102a$ includes first to (n−1)th light-receiving elements $131_1$ to $131_{(n-1)}$, i.e., (n−1) types of light-receiving elements. The light-receiving elements $131_1$ to $131_{(n-1)}$ can selectively receive lights emitted from the first to (n−1)th single-color inks among the first to n-th single-color inks, respectively. Also, the light-receiving elements $131_1$ to $131_{(n-1)}$ can each receive light emitted from the n-th single-color ink. Although FIG. 1 is simplified and shows only two types of light-receiving elements $131_1$ and $131_{(n-1)}$, the light-receiving unit $102a$ possibly includes three or more types of light-receiving elements.

The light-receiving unit $102a$ may include a plurality of pixels Pix in one array lying in the main scanning direction (Y direction) of the optical sensor $2a$. Each pixel Pix may include first to (n−1)th light-receiving elements $131_1$ to $131_{(n-1)}$. In other words, the light-receiving unit $102a$ may include a plurality of sets of the first to (n−1)th light-receiving elements $131_1$ to $131_{(n-1)}$, and the plurality of sets of the first to (n−1)th light-receiving elements $131_1$ to $131_{(n-1)}$ may be arrayed in the main scanning direction (Y direction) of the optical sensor $2a$.

The first to (n−1)th light-receiving elements $131_1$ to $131_{(n-1)}$ may be a combination of a blue light-receiving element including a blue color resist (color filter) that mainly transmits infrared light and blue light and absorbs red light and green light, a green light-receiving element including a green color resist (color filter) that mainly transmits infrared light and green light and absorbs red light and blue light, and a red light-receiving element including a red color resist (color filter) that mainly transmits infrared light and red light and absorbs green light and blue light.

The storage unit $30a$ stores correction values based on reference data obtained by receiving lights emitted from the first to n-th single-color inks individually in the light-receiving unit $102a$ by type of single-color inks. For example, the storage unit 30a may store a set of correction values based on reference data obtained by receiving phosphorescences emitted from the first to n-th single-color inks individually in the light-receiving unit 102a by type of single-color inks, a set of correction values based on reference data obtained by receiving fluorescences emitted from the first to n-th single-color inks individually in the light-receiving unit 102a by type of single-color inks, or both sets of correction values. Reference data on different types of single-color inks can be acquired, for example, before shipment of the optical sensor 2a.

The correction values may be based on a matrix A with n rows and n columns represented by the above Formula (1).

The correction values may be based on a normalized matrix of the matrix A represented by the above Formula (1). In the normalized matrix of the matrix A, each diagonal element is 1.

The correction values may be based on an inverse matrix of the normalized matrix. The storage unit 30a may store the inverse matrix as correction values.

The normalized matrix may be obtained by calculation including dividing each matrix element in a y-th column (each column) of the matrix A by a matrix element in a y-th row and the y-th column of the matrix A. In other words, the normalized matrix may be obtained by dividing each matrix element in an i-th column (wherein i is an integer varying from 1 to y) of the matrix A by a matrix element in the i-th row and the i-th column.

The correction processing unit 11a corrects detection data with the correction values, the detection data obtained by receiving, in the light-receiving unit 102a, light emitted from a banknote BN irradiated with light from the light source 101a. With the corrected detection data, light (e.g., single-color light) emitted from the n-th single-color ink can be recognized without use of a light-receiving element capable of selectively receiving light emitted from the n-th single-color ink.

The correction processing unit 11a may multiply by the inverse matrix the detection data obtained by receiving, in the light-receiving unit 102a, light emitted from the banknote BN to be recognized. In this case, the detection data may be a column vector in which the entries in the first to (n−1)th rows are the output values of the first to (n−1)th light-receiving elements $131_1$ to $131_{(n-1)}$ when the banknote to be recognized is irradiated with light, and the entry in the n-th row is the sum of these output values of the first to (n−1)th light-receiving elements $131_1$ to $131_{(n-1)}$. This column vector may be multiplied by the inverse matrix, from left to right. The correction processing unit 11a may calculate, as the product, the output value (corrected optical signal) related to each single-color ink from which crosstalk is eliminated.

The detection data to be corrected by the correction processing unit 11a may be obtained by receiving lights in all of the first to (n−1)th light-receiving elements $131_1$ to $131_{(n-1)}$, or in at least two types of light-receiving elements among the first to (n−1)th light-receiving elements $131_1$ to $131_{(n-1)}$. In the former case, the signal level of light emitted from the n-th single-color ink can be about (n−1) times the actual signal level. In the latter case, the signal level of light emitted from the n-th single-color ink can be about at least twice the actual signal level.

The correction processing unit 11a may correct the detection data obtained by receiving, in the light-receiving unit 102a, phosphorescence emitted from a banknote BN irradiated with excitation light from the light source 101a with the correction values related to phosphorescence described above, may correct detection data obtained by receiving, in the light-receiving unit 102a, fluorescence emitted from a banknote BN irradiated with excitation light from the light source 101a with the correction values related to fluorescence described above, or may execute both of these corrections.

The correction processing unit 11a may function when a control unit (controller, not shown) of the optical sensor 2a executes the corresponding programs. The control unit may execute the programs stored in the storage unit 30a to function as the correction processing unit 11a and a recognition unit (not shown).

Figure 2:
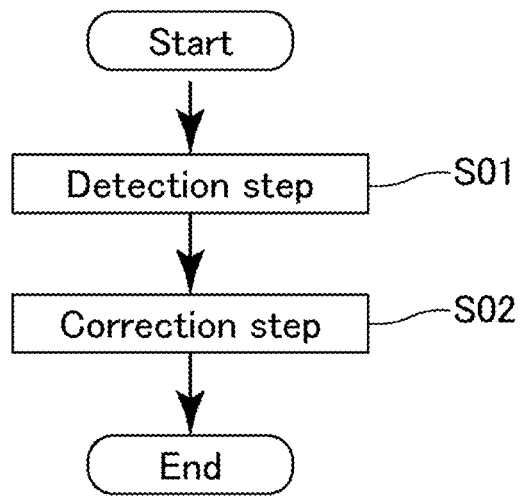
FIG. 2 is a flowchart showing an example of the procedure of processing executed by the optical sensor and the light detection method of Embodiment 1.

Next, with reference to FIG. 2, the procedure of the processing executed by the optical sensor and the light detection method of the present embodiment are described.

The light detection method of the present embodiment, as shown in FIG. 2, starts with obtaining detection data by receiving light (e.g., phosphorescence or fluorescence) emitted from a banknote BN irradiated with light (e.g., excitation light) from the light source 101a in the light-receiving unit 102a including the first to (n−1)th light-receiving elements $131_1$ to $131_{(n-1)}$ (detection step S01).

Next, the correction processing unit 11a corrects the detection data with the correction values (correction step S02).

Thereafter, the recognition unit may execute recognition processing based on the corrected detection data. For example, the recognition unit may determine the presence or absence of the n-th single-color ink to determine the authenticity of the banknote BN based on the presence or absence.

Embodiment 2

Summary of the Present Embodiment

An optical sensor of the present embodiment detects light, which is phosphorescence here, from a banknote on which is printed at least one type of single-color ink among first to fourth four types of single-color inks that emit lights having wavelength bands different from one another. The first single-color ink is a blue ink and is hereinafter referred to as a first single-color ink (B). The second single-color ink is a green ink and is hereinafter referred to as a second single-color ink (G). The third single-color ink is a red ink and is hereinafter referred to as a third single-color ink (R). The fourth single-color ink is an infrared ink and is hereinafter referred to as a fourth single-color ink (IR). The first single-color ink (B), the second single-color ink (G), the third single-color ink (R), and the fourth single-color ink (IR), when irradiated with light having a predetermined wavelength band as the excitation light, respectively emit blue light, green light, red light, and infrared light (IR) as the phosphorescence. The excitation light is not limited and may be, for example, visible light, ultraviolet light, or infrared light.

Figure 3:
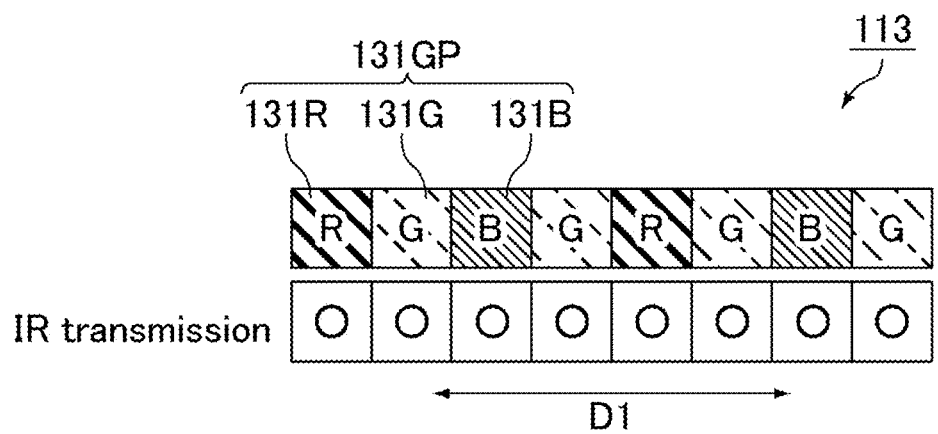
FIG. 3 is a conceptual diagram showing light-receiving elements in an optical sensor of Embodiment 2.

The optical sensor of the present embodiment, as shown in FIG. 3, includes a light-receiving unit (light receiver) 113 including a plurality of pixels 131GP in one array lying in the main scanning direction D1. Each pixel 131GP includes first to third three types of light-receiving elements 131B, 131G, and 131R. The first light-receiving element 131B, the second light-receiving element 131G, and the third light-receiving element 131R are respectively capable of selectively receiving blue light from the first single-color ink (B), green light from the second single-color ink (G), and red light from the third single-color ink (R). The first light-receiving element 131B, the second light-receiving element 131G, and the third light-receiving element 131R each are capable of receiving infrared light (IR emission) from the fourth single-color ink (IR).

In the present embodiment, before banknote recognition, phosphorescence signals of the first single-color ink (B), the second single-color ink (G), the third single-color ink (R), and the fourth single-color ink (IR) are acquired individually in the optical sensor of the present embodiment by type of single-color inks. Correction values based on the acquired phosphorescence signals are stored in the storage unit (memory). For banknote recognition, the phosphorescence signals acquired using the first to third light-receiving elements 131B, 131G, and 131R from the banknote to be recognized are corrected with the correction values. This configuration allows recognition of light (infrared light) emitted from the fourth single-color ink (IR) without use of a light-receiving element capable of selectively receiving light (infrared light) emitted from the fourth single-color ink (IR).

Specifically, for example, before shipment, phosphorescence signals of the first single-color ink (B), the second single-color ink (G), the third single-color ink (R), and the fourth single-color ink (IR) are acquired (individually) in the optical sensor of the present embodiment (first to third light-receiving elements 131B, 131G, and 131R) by type of inks. An inverse matrix as the correction values in the following Formula (A1) is calculated, which is then stored in the storage unit (memory). For banknote recognition in the optical sensor, as shown in the following Formula (A1), the phosphorescence signals acquired from the banknote to be recognized are multiplied by the stored inverse matrix. This configuration allows recognition of infrared light emitted from the fourth single-color ink (IR) without use of a light-receiving element capable of selectively receiving infrared light emitted from the fourth single-color ink (IR).

$$\begin{bmatrix} B'_{pq} \\ G'_{pq} \\ R'_{pq} \\ RGB'_{pq} \end{bmatrix} = \begin{bmatrix} 1 & d & g & j \\ a & 1 & h & k \\ b & e & 1 & l \\ c & f & i & 1 \end{bmatrix}^{-1} \begin{bmatrix} B_{pq} \\ G_{pq} \\ R_{pq} \\ R_{pq} + G_{pq} + B_{pq} \end{bmatrix} \quad \text{Formula (A1)}$$

Corrected phosphorescence signals | Correction values | Phosphorescence signals of banknote to be recognized In the above Formula (A1), the variables are defined as follows.

$B_{pq}$: Phosphorescence signal from the banknote to be recognized acquired in the first light-receiving element 131B

$G_{pq}$: Phosphorescence signal from the banknote to be recognized acquired in the second light-receiving element 131G

$R_{pq}$: Phosphorescence signal from the banknote to be recognized acquired in the third light-receiving element 131R

$B'_{pq}$: Phosphorescence signal of the first single-color ink (B) emitted from the banknote to be recognized $G'_{pq}$: Phosphorescence signal of the second single-color ink (G) emitted from the banknote to be recognized $R'_{pq}$: Phosphorescence signal of the third single-color ink (R) emitted from the banknote to be recognized $RGB'_{pq}$: Phosphorescence signal of the fourth single-color ink (IR) emitted from the banknote to be recognized a: (Phosphorescence signal of ink B alone in pixel G)/ (phosphorescence signal of ink B alone in pixel B)

b: (Phosphorescence signal of ink B alone in pixel R)/ (phosphorescence signal of ink B alone in pixel B)

c: (Sum of phosphorescence signals of ink B alone in pixels RGB)/(phosphorescence signal of ink B alone in pixel B)

d: (Phosphorescence signal of ink G alone in pixel B)/ (phosphorescence signal of ink G alone in pixel G)

e: (Phosphorescence signal of ink G alone in pixel R)/ (phosphorescence signal of ink G alone in pixel G)

f: (Sum of phosphorescence signals of ink G alone in pixels RGB)/(phosphorescence signal of ink G alone in pixel G)

g: (Phosphorescence signal of ink R alone in pixel B)/ (phosphorescence signal of ink R alone in pixel R)

h: (Phosphorescence signal of ink R alone in pixel G)/ (phosphorescence signal in ink R alone in pixel R)

i: (Sum of phosphorescence signals of R ink alone in pixels RGB)/(phosphorescence signal of ink R alone in pixel R)

j: (Phosphorescence signal of ink IR alone in pixel B)/(sum of phosphorescence signals of ink IR alone in pixels RGB)

k: (Phosphorescence signal of ink IR alone in pixel G)/(sum of phosphorescence signals of ink IR alone in pixels RGB)

l: (Phosphorescence signal of ink IR alone in pixel R)/(sum of phosphorescence signals of ink IR alone in pixels RGB)

p: pixel index q: acquisition line

In the above definitions, the ink B means the first single-color ink (B), the ink G means the second single-color ink (G), the ink R means the third single-color ink (R), the ink IR means the fourth single-color ink (IR), the pixel B means the first light-receiving element 131B, the pixel G means the second light-receiving element 131G, and the pixel R means the third light-receiving element 131R. The "phosphorescence signal of ink N alone in pixel M" (where N represents B, G, or R and M represents B, G, R, or RGB) means the phosphorescence signal in the pixel M when light from the ink N is received alone in the light-receiving unit (light receiver). The "sum of phosphorescence signals in pixels RGB" means the sum of phosphorescence signals in the pixel B, the pixel G, and the pixel B. The pixel index is a sequential number assigned to each pixel of the optical sensor. The acquisition line is a sequential number assigned to each line data piece acquired in the optical sensor.

Figure 4:
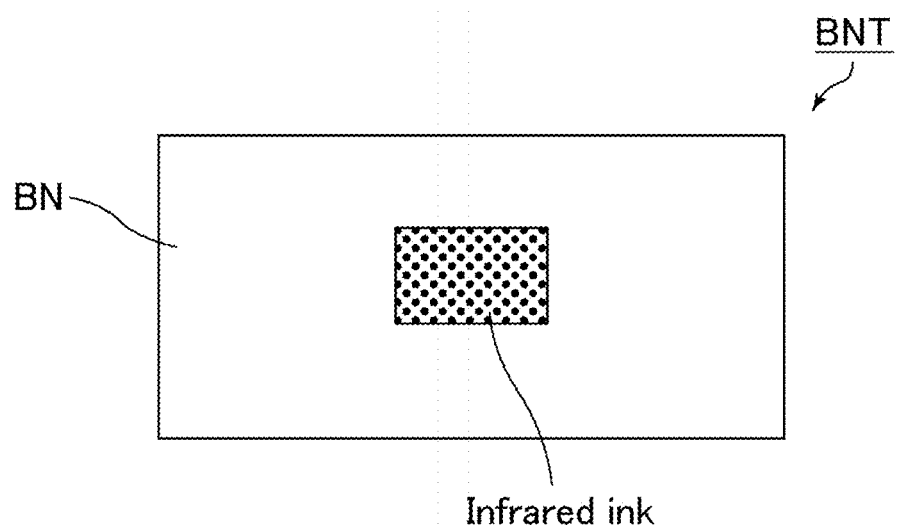
FIG. 4 is a schematic view of a test sample in which a fourth single-color ink (IR) is printed on a banknote.
Figure 5:
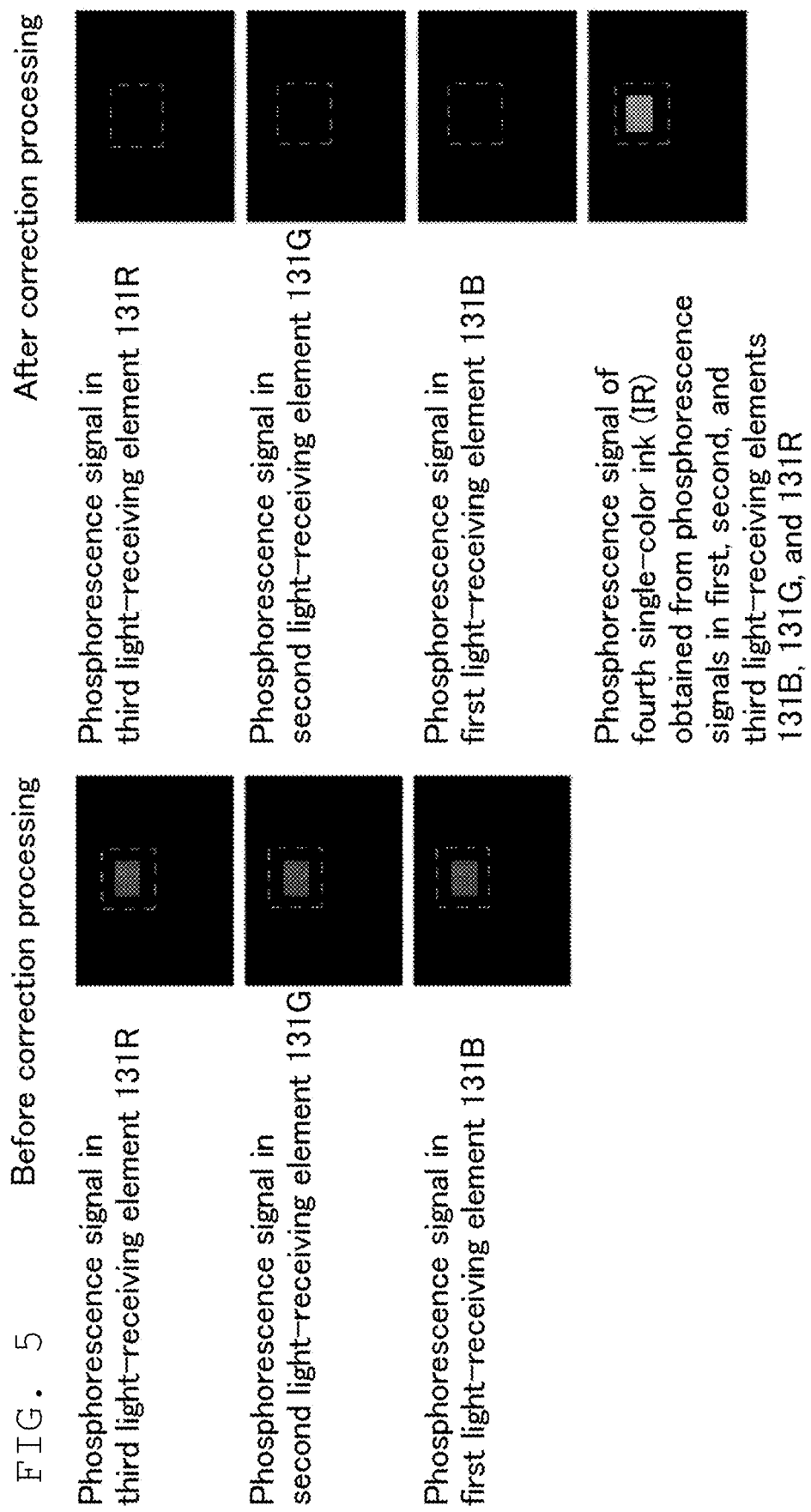
FIG. 5 includes phosphorescence images showing correction processing using the optical sensor of Embodiment 2.

For example, as shown in FIG. 4, a test sample BNT in which the fourth single-color ink (IR) is printed on a banknote BN is irradiated with excitation light, and then imaged with the optical sensor of the present embodiment. This results in, as shown in FIG. 5, acquisition of a phosphorescence signal in each of the three types of light-receiving elements before correction processing. Since each of the three types of light-receiving elements can receive light other than infrared light as well, the acquired phosphorescence signals do not indicate whether or not the fourth single-color ink (IR) is printed on the test sample BNT. The correction processing in the present embodiment enables extraction of phosphorescence signals of the fourth single-color ink (IR) from the phosphorescence signals acquired in the first to third light-receiving elements, thus allowing determination of whether or not the fourth single-color ink (IR) is printed on the test sample BNT. Thus, in the present embodiment, infrared light receivable in the first, second, and third light-receiving elements 131B, 131G, and 131R can be recognized while the cost is reduced by eliminating the need for additional infrared cut filters in these three types of light-receiving elements.

<Structure of Banknote Handling Device>

Figure 6:
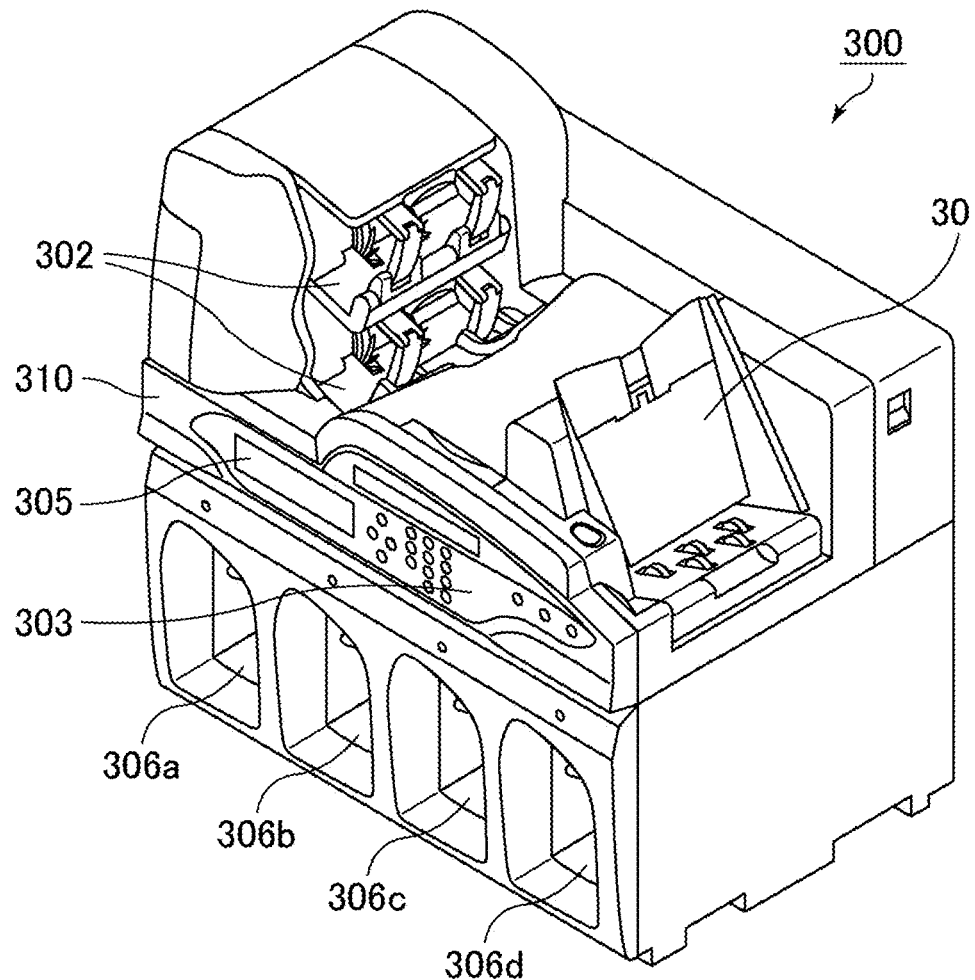
FIG. 6 is a schematic perspective view of the appearance of a banknote handling device of Embodiment 2.

Next, the structure of a banknote handling device of the present embodiment including an optical sensor is described with reference to FIG. 6. The banknote handling device of the present embodiment may have a structure shown in FIG. 6, for example. A banknote handling device 300 in FIG. 6 is a small-sized, tabletop banknote handling device and includes the optical sensor described above (not shown in FIG. 6), as well as a banknote recognition unit (not shown in FIG. 6) that executes the banknote recognition processing; a hopper 301 in which a plurality of banknotes to be handled is to be stacked; two rejectors 302 each of which feeds out a banknote which has been fed from the hopper 301 into a housing 310 and determined as a reject note such as a counterfeit note or a suspect note; an operation unit 303 with which the operator inputs commands; four stackers 306a to 306d into each of which banknotes whose denomination, authenticity, and fitness have been recognized in the housing 310 are to be sorted and stacked; and a display 305 that displays information including the banknote recognition and counting results and the stacking status in each of the stackers 306a to 306d. Based on the results of fitness determination by the banknote recognition unit, fit notes are to be stored in the stackers 306a to 306c among the four stackers 306a to 306d, and unfit notes are to be stored in the stacker 306d. The method of sorting banknotes into the stackers 306a to 306d is settable as desired.

<Structure of Imaging Unit>

Figure 7:
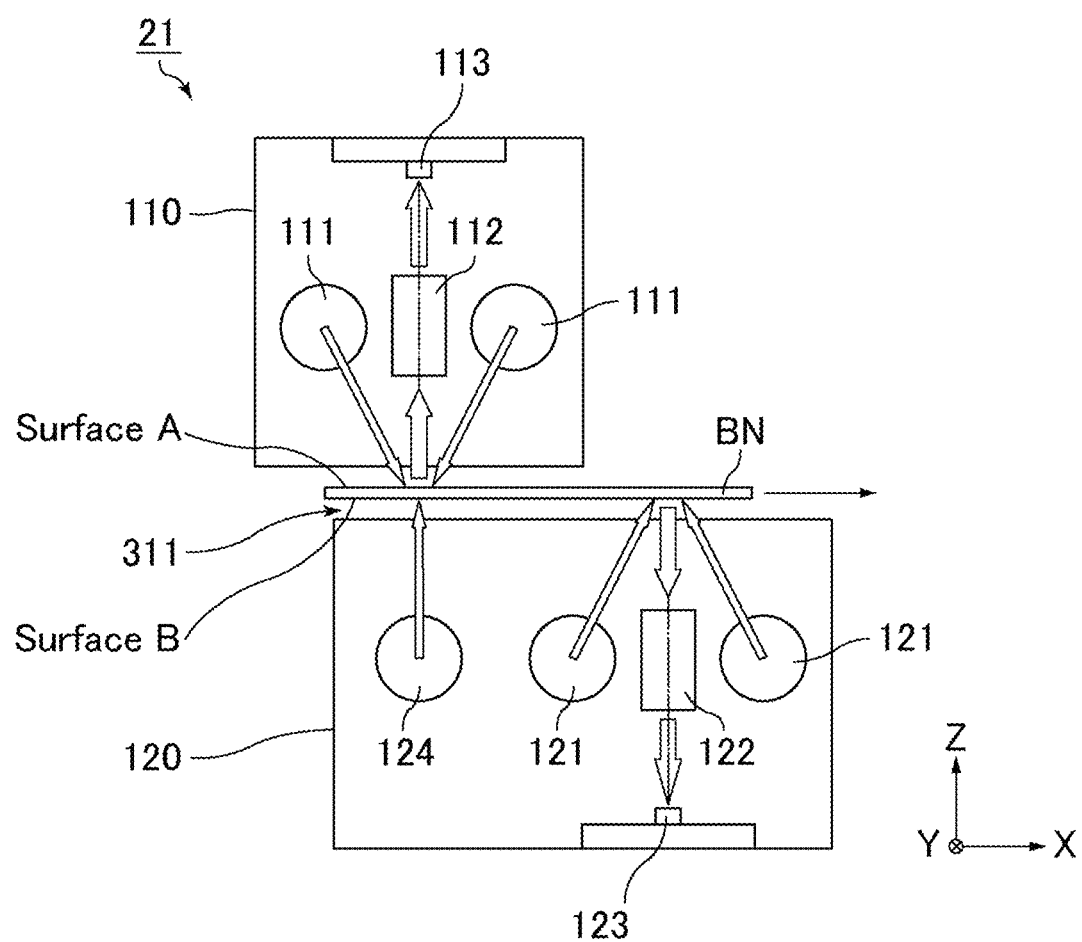
FIG. 7 is a schematic cross-sectional view showing the structure of an imaging unit in the optical sensor of Embodiment 2.

Next, the structure of an imaging unit, which is the key device of the optical sensor of the present embodiment, is described with reference to FIG. 7 to FIG. 9. As shown in FIG. 7, an imaging unit 21 includes an upper unit 110 and a lower unit 120 opposing each other. A space in which banknotes BN are to be transported in the X direction in the XY plane is formed between the upper unit 110 and the lower unit 120 spaced from each other in the Z direction. This space defines part of a transport path 311 of the banknote handling device of the present embodiment. The upper unit 110 and the lower unit 120 are positioned above (+Z direction) and below (−Z direction) the transport path 311, respectively. The Y direction corresponds to the main scanning direction of the imaging unit 21. The X direction corresponds to the sub-scanning direction of the imaging unit 21.

As shown in FIG. 7, the upper unit 110 includes two reflection light sources 111, a condensing lens 112, and a light-receiving unit (light receiver) 113. The reflection light sources 111 each sequentially irradiate a main surface (hereinafter, surface A) of each banknote BN facing the light-receiving unit 113 with irradiation lights having different wavelength bands, which are specifically infrared light, white light including red light, green light, and blue light, and excitation light for phosphorescence. The condensing lens 112 collects light emitted from the reflection light sources 111 and reflected by the surface A of a banknote BN, light emitted from a transmission light source 124 in the lower unit 120 and transmitted through the banknote BN, and phosphorescence emitted from the surface A of the banknote BN. The light-receiving unit 113 receives light collected by the condensing lens 112 and converts the light to electrical signals. The light-receiving unit 113 then amplifies the electrical signals, converts the amplified signals to digital data by A/D conversion, and outputs the digital data as image signals.

The lower unit 120 includes two reflection light sources 121, the transmission light source 124, a condensing lens 122, and a light-receiving unit (light receiver) 123. The reflection light sources 121 sequentially irradiate a main surface (hereinafter, surface B) of each banknote BN facing the light-receiving unit 123 with irradiation lights having different wavelength bands, which are specifically infrared light, white light including red light, green light, and blue light, and excitation light for phosphorescence. The condensing lens 122 collects light emitted from the reflection light sources 121 and reflected by the surface B of the banknote BN and phosphorescence emitted from the surface B of the banknote BN. The light-receiving unit 123 receives light collected by the condensing lens 122 and converts the light to electrical signals. The light-receiving unit 113 then amplifies the electrical signals, converts the amplified signals to digital data by A/D conversion, and outputs the digital data as image signals. The light-receiving unit 123 has the same structure as the light-receiving unit 113.

The transmission light source 124 is on the optical axis of the condensing lens 112 in the upper unit 110. Part of light emitted from the transmission light source 124 is transmitted through the banknote BN, collected by the condensing lens 112 in the upper unit 110, and detected by the light-receiving unit 113. The transmission light source 124 irradiates the surface B of the banknote BN with irradiation lights having different wavelength bands, which are specifically infrared light and green light.

The light sources 111, 121, and 124 each include a line-shaped light guide (not shown) extending in a direction (main scanning direction D1) vertical to the plane of the paper showing FIG. 7, and LED elements (not shown) on each end (which may be one end) of the light guide.

The light sources 111 and 121 may each include an LED element that emits infrared light (IR) having a peak wavelength of 750 nm or longer, an LED element that emits red light (R) having a peak wavelength of 600 nm or longer and shorter than 750 nm, an LED element that emits green light (G) having a peak wavelength of 500 nm or longer and shorter than 600 nm, an LED element that emits blue light (B) having a peak wavelength of 400 nm or longer and shorter than 500 nm, and an LED element that emits light having a peak wavelength within the wavelength band of excitation light.

The light source 124 may include an LED element that emits green light having a peak wavelength of 500 nm or longer and shorter than 600 nm, and an LED element that emits infrared light having a peak wavelength of 750 nm or longer.

Figure 8:
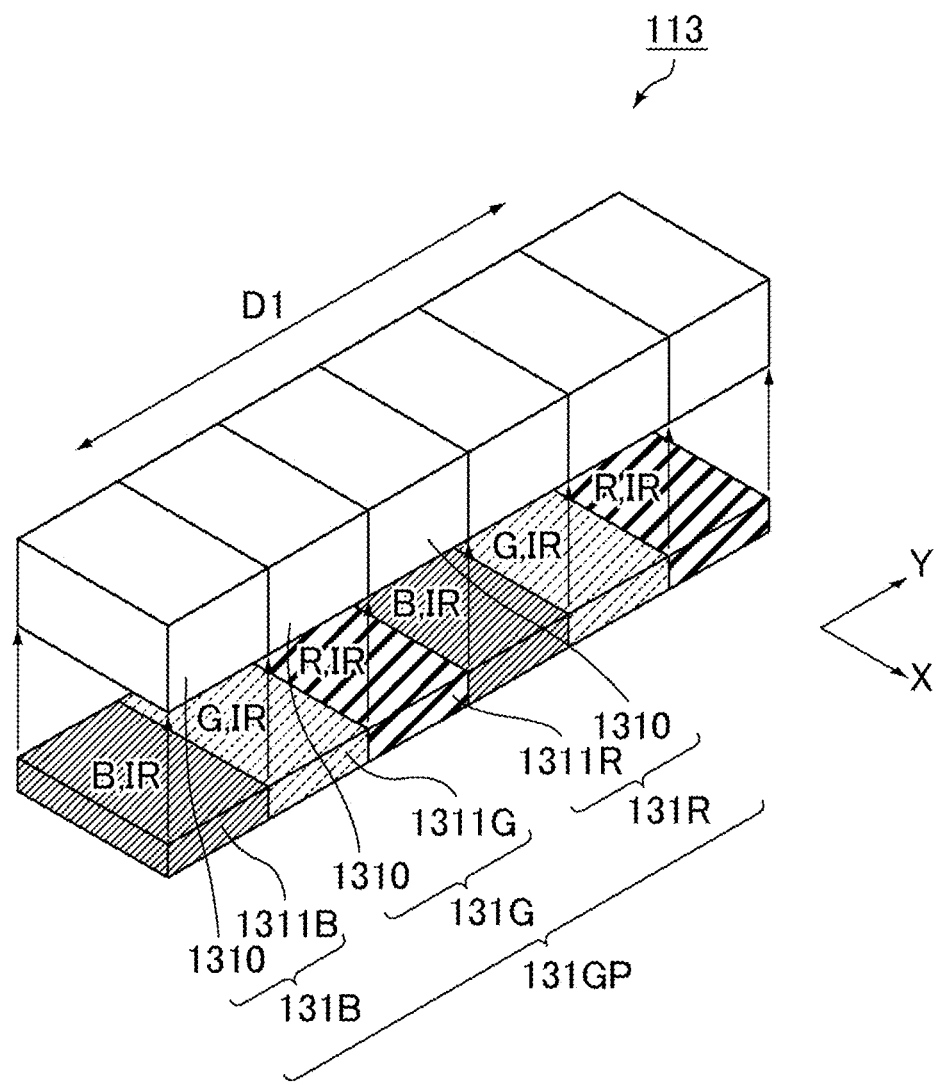
FIG. 8 is a schematic perspective view of a light-receiving unit in the optical sensor of Embodiment 2.

As shown in FIG. 8, the light-receiving units 113 and 123 each include the pixels 131GP in one array lying in the main scanning direction D1 (direction perpendicular to the transport direction of banknotes BN; Y direction). Each pixel 131GP includes one first light-receiving element (imaging element) 131B, one second light-receiving element (imaging element) 131G, and one third light-receiving element (imaging element) 131R. The first light-receiving element 131B, the second light-receiving element 131G, and the third light-receiving element 131R are arranged in one array in this order in the main scanning direction D1.

The first light-receiving element 131B is a blue light-receiving element including a photodetector 1310 and a blue color resist (color filter) 1311B that transmits infrared light and blue light and absorbs red light and green light. The second light-receiving element 131G is a green light-receiving element including a photodetector 1310 and a green color resist (color filter) 1311G that transmits infrared light and green light and absorbs red light and blue light. The third light-receiving element 131R is a red light-receiving element including a photodetector 1310 and a red color resist (color filter) 1311R that transmits infrared light and red light and absorbs green light and blue light.

A light-receiving element (imaging element) means an element that detects the intensity of light having a predetermined wavelength band (converts the light into an electrical signal). A light-receiving element may include a photodetector such as a photodiode and a color resist that is provided on the light-receiving surface of the photodetector and reduces transmission of lights having wavelength bands (e.g., green and red wavelength bands) except for light(s) having the predetermined wavelength band(s) to be detected (e.g., blue and infrared wavelength bands).

Figure 9:
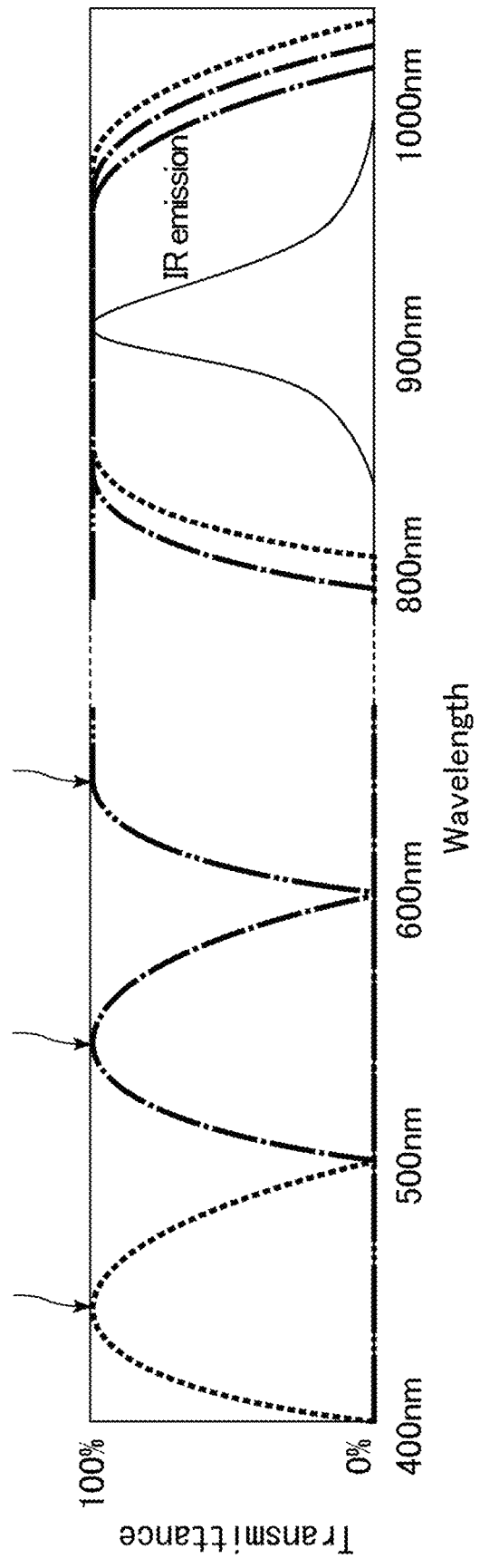
FIG. 9 is a schematic view showing the wavelength characteristics of color resists in the optical sensor of Embodiment 2.

As shown in FIG. 9, the blue color resist (color filter) 1311B mainly transmits blue light and infrared light (indicated by the dashed line), the green color resist (color filter) 1311G mainly transmits green light and infrared light (indicated by the dash-dot line), and the red color resist (color filter) 1311R mainly transmits red light and infrared light (indicated by the dash-dot-dot line). The first light-receiving element 131B, the second light-receiving element 131G, and the third light-receiving element 131R are respectively capable of selectively receiving blue light emitted from the first single-color ink (B), green light emitted from the second single-color ink (G), and red light emitted from the third single-color ink (R), and the first light-receiving element 131B, the second light-receiving element 131G, and the third light-receiving element 131R each are capable of receiving infrared light emitted from the fourth single-color ink (IR). The color resists of these respective colors, however, usually transmit lights of colors other than the corresponding colors to some degree. Thus, the first to third light-receiving elements 131B, 131G, and 131R may possibly receive lights of colors other than the corresponding colors.

A light-receiving element capable of selectively receiving light emitted from a single-color ink means a light-receiving element that outputs a higher output value P when receiving light from the single-color ink than an output value Q when receiving light from another type of single-color ink. The ratio of the output value P to the output value Q is, for example, 1.5 or more.

The upper unit 110 and the lower unit 120 each repeat imaging of a banknote BN transported in the transport direction and output image signals, so that the imaging unit 21 captures an image of the entire banknote BN. Specifically, the imaging unit 21 acquires a transmission image of the banknote BN and a reflection image and a phosphorescence image of the surface A of the banknote BN based on the output signals from the upper unit 110, while acquiring a reflection image and a phosphorescence image of the surface B of the banknote BN based on the output signals from the lower unit 120.

<Structure of Banknote Recognition Unit>

Figure 10:
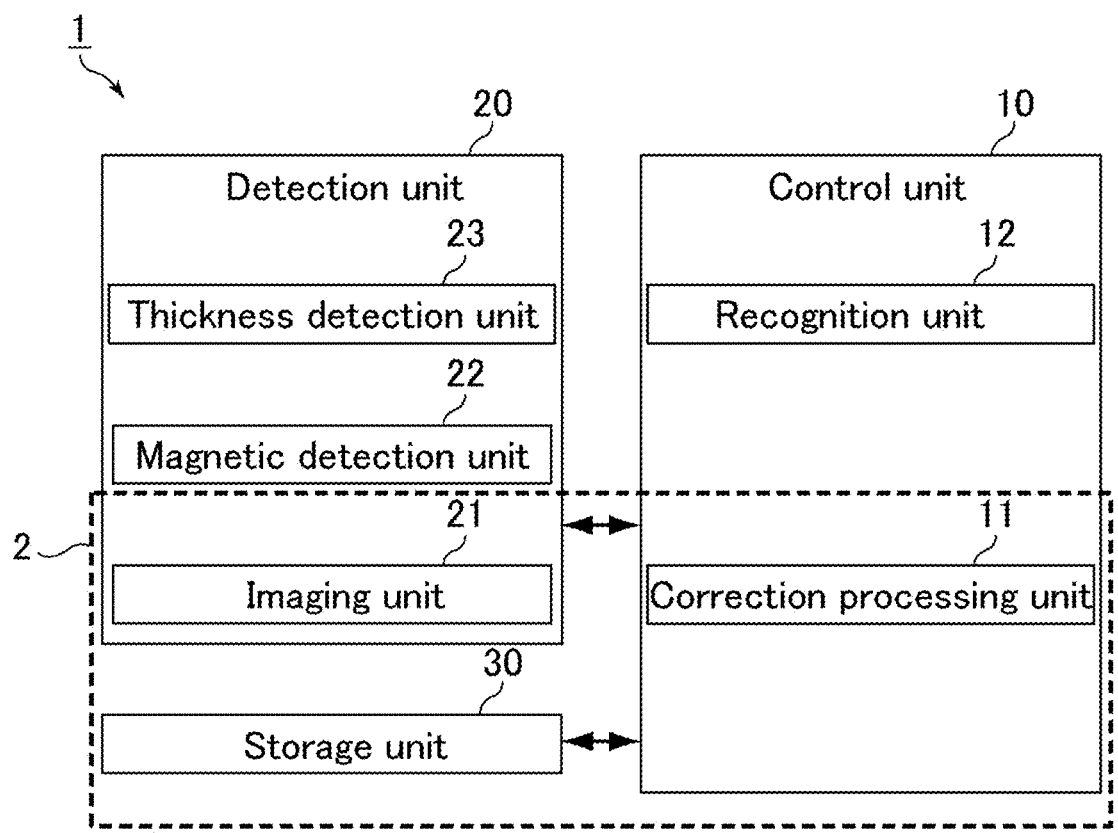
FIG. 10 is a block diagram showing the structure of a banknote recognition unit of Embodiment 2.

The structure of the banknote recognition unit of the present embodiment is described with reference to FIG. 10. As shown in FIG. 10, a banknote recognition unit 1 of the present embodiment includes a control unit (controller) 10, a detection unit 20, and a storage unit (memory) 30.

The control unit 10 includes, for example, programs for executing various processings stored in the storage unit 30, a central processing unit (CPU) that executes the programs, and various hardware devices (e.g., field programmable gate array (FPGA)) controlled by the CPU. The control unit 10 controls the components of the banknote recognition unit 1 following the programs stored in the storage unit 30 based on signals output from the components of the banknote recognition unit 1 and control signals from the control unit 10. The control unit 10 executes the programs stored in the storage unit 30 to function as the correction processing unit 11 and the recognition unit 12.

The detection unit 20 includes a magnetic detection unit 22 and a thickness detection unit 23 as well as the imaging unit 21 along the transport path of banknotes. The imaging unit 21 captures images of each banknote and outputs image signals (image data) as described above. The magnetic detection unit 22 includes a magnetic sensor (not shown) that determines magnetism. The magnetic detection unit uses the magnetic sensor to detect magnetism of a component printed on a banknote, such as a magnetic ink or a security thread. The magnetic sensor is a magnetic line sensor in which magnetic detection elements are arranged in a line. The thickness detection unit 23 includes a thickness detection sensor (not shown) that measures the thickness of a banknote. The thickness detection unit 23 uses the thickness detection sensor to detect tape or multi feed, for example. The thickness detection sensor includes rollers each with a sensor and facing each other across the transport path, and uses the sensors to detect a displacement amount when the banknote passes between the rollers. In the present embodiment, an optical sensor 2 of the present embodiment is defined at least by the imaging unit 21 including the light-receiving units 113 and 123 and the light sources 111, 121, and 124, the storage unit 30, and the correction processing unit 11.

The storage unit 30 is defined by a nonvolatile storage device such as a semiconductor memory or a hard disk. The storage unit 30 stores programs and data necessary for the control of the banknote recognition unit 1.

The storage unit 30 also stores correction values based on reference data obtained by receiving phosphorescences respectively emitted from the four types of single-color inks, namely the first single-color ink (B), the second single-color ink (G), the third single-color ink (R), and the fourth single-color ink (IR), individually in each of the light-receiving units 113 and 123 by type of single-color inks. Reference data on different types of single-color inks can be acquired, for example, before shipment of the banknote handling device. Correction values can be calculated by the following method, for example. The same procedure can be employed to calculate correction values based on the reference data obtained in the light-receiving unit 113 and those based on the reference data obtained in the light-receiving unit 123. Thus, the following shows only a case of using data obtained in the light-receiving unit 113.

First, a matrix A with n rows and n columns represented by the following Formula (1) is calculated. In the matrix A, the first to (n−1)th light-receiving elements receive phosphorescence emitted from the n-th single-color ink, and an added value of the phosphorescence components received in the first to (n−1)th light-receiving elements is taken as the phosphorescent component emitted from the n-th single-color ink. Thus, the signal level of phosphorescence emitted from the n-th single-color ink is about (n−1) times the actual signal level. The added value here means the sum of the values.

$$A = \begin{bmatrix} A_{11} & \cdots & A_{1n} \\ \vdots & \ddots & \vdots \\ A_{(n-1)1} & \cdots & A_{(n-1)n} \\ \sum_{i=1}^{n-1} A_{i1} & \cdots & \sum_{i=1}^{n-1} A_{in} \end{bmatrix} \quad \text{Formula (1)}$$

In the above Formula (1), a matrix element $A_{xy}$ is an output value of an x-th light-receiving element when phosphorescence emitted from a y-th single-color ink among the first to n-th single-color inks is received alone in the light-receiving unit (light receiver), where x is an integer of 1 or greater and (n−1) or smaller and y is an integer of 1 or greater and n or smaller.

The above Formula (1) is specifically a matrix A(4) with 4 rows and 4 columns represented by the following Formula (1-1). The matrix A(4) is calculated by receiving phosphorescences respectively emitted from the four types of single-color inks, namely the first single-color ink (B), the second single-color ink (G), the third single-color ink (R), and the fourth single-color ink (IR), individually in the light-receiving unit 113 by type of single-color inks to measure the reference emission intensity of each single-color ink. In the matrix A(4) represented by the following Formula (1-1), an added value of infrared light components received in the first, second, and third light-receiving elements 131B, 131G, and 131R is taken as the infrared light component. Thus, the signal level of infrared light is about three times the actual signal level.

$$A(4) = \begin{bmatrix} A_{11} & A_{12} & A_{13} & A_{14} \\ A_{21} & A_{22} & A_{23} & A_{24} \\ A_{31} & A_{32} & A_{33} & A_{34} \\ \sum_{i=1}^{3} A_{i1} & \sum_{i=1}^{3} A_{i2} & \sum_{i=1}^{3} A_{i3} & \sum_{i=1}^{3} A_{i4} \end{bmatrix} \quad \text{Formula (1-1)}$$

In the above Formula (1-1), a matrix element $A_{xy}$ is an output value of an x-th light-receiving element when phosphorescence emitted from a y-th single-color ink among the first single-color ink (B), the second single-color ink (G), the third single-color ink (R), and the fourth single-color ink (IR) is received alone in the light-receiving unit 113, where x is an integer of 1 or greater and 3 or smaller and y is an integer of 1 or greater and 4 or smaller.

For example, the matrix element $A_{11}$ is the output value of the first light-receiving element 131B when phosphorescence emitted from the first single-color ink (B) is received alone in the light-receiving unit 113.

In addition, a normalized matrix B of the matrix A represented by the above Formula (1) is calculated. The matrix B is represented by the following Formula (2).

$$B = \begin{bmatrix} 1 & \cdots & \dfrac{A_{1n}}{\left[\sum_{i=1}^{n-1} A_{in}\right]} \\ \vdots & \ddots & \vdots \\ A_{(n-1)1}/A_{11} & \cdots & \dfrac{A_{(n-1)n}}{\left[\sum_{i=1}^{n-1} A_{in}\right]} \\ \left[\sum_{i=1}^{(n-1)} A_{i1}\right]/A_{11} & \cdots & 1 \end{bmatrix} \quad \text{Formula (2)}$$

In the above Formula (2), a matrix element $A_{xy}$ is an output value of an x-th light-receiving element when phosphorescence emitted from a y-th single-color ink among the first to n-th single-color inks is received alone in the light-receiving unit (light receiver), where x is an integer of 1 or greater and (n−1) or smaller and y is an integer of 1 or greater and n or smaller.

In the above Formula (2), the matrix elements in the second column to the (n−1)th column in the matrix B are omitted. Similar to the first column and the n-th column in the matrix B, the matrix element $A_{xy}$ in the second column to the (n−1)th column in the matrix B is obtained by dividing the matrix element $A_{xy}$ in the matrix A by the matrix element $A_{yy}$ in the matrix A.

The above Formula (2) is specifically a matrix B(4) with 4 rows and 4 columns represented by the following Formula (2-1).

$$B(4) = \begin{bmatrix} 1 & A_{12}/A_{22} & A_{13}/A_{33} & \dfrac{A_{14}}{\left[\sum_{i=1}^{3} A_{i4}\right]} \\ A_{21}/A_{11} & 1 & A_{23}/A_{33} & \dfrac{A_{24}}{\left[\sum_{i=1}^{3} A_{i4}\right]} \\ A_{31}/A_{11} & A_{32}/A_{22} & 1 & \dfrac{A_{34}}{\left[\sum_{i=1}^{3} A_{i4}\right]} \\ \left[\sum_{i=1}^{3} A_{i1}\right]/A_{11} & \left[\sum_{i=1}^{3} A_{i2}\right]/A_{22} & \left[\sum_{i=1}^{3} A_{i3}\right]/A_{33} & 1 \end{bmatrix} \quad \text{Formula (2-1)}$$

In the above Formula (2-1), a matrix element $A_{xy}$ is an output value of an x-th light-receiving element when phosphorescence emitted from a y-th single-color ink among the first single-color ink (B), the second single-color ink (G), the third single-color ink (R), and the fourth single-color ink (IR) is received alone in the light-receiving unit 113, where x is an integer of 1 or greater and 3 or smaller and y is an integer of 1 or greater and 4 or smaller.

As shown in the above Formula (2), the normalized matrix B of the matrix A is obtained by calculation including dividing each matrix element in a y-th column (each column) of the matrix A by a matrix element in a y-th row and the y-th column. In other words, the normalized matrix B of the matrix A is obtained by dividing each matrix element in an i-th column (wherein i is an integer varying from 1 to y) of the matrix A by a matrix element in the i-th row and the i-th column. In the normalized matrix B of the matrix A, each diagonal element is 1.

Similarly, as shown in the above Formula (2-1), the normalized matrix B(4) of the matrix A(4) is obtained by calculation including dividing each matrix element in a y-th column (each column) of the matrix A(4) by a matrix element in a y-th row and the y-th column. In other words, the normalized matrix B(4) of the matrix A(4) is obtained by dividing each matrix element in an i-th column (wherein i is an integer varying from 1 to y) of the matrix A(4) by a matrix element in the i-th row and the i-th column. In the normalized matrix B(4) of the matrix A(4), each diagonal element is 1.

Lastly, an inverse matrix $B^{-1}$ of the normalized matrix B is stored as correction values in the storage unit 30.

The inverse matrix $B^{-1}$ is specifically an inverse matrix $B(4)^{-1}$ of the matrix B(4).

The correction processing unit 11 corrects the detection data with the correction values, the detection data obtained by receiving, in the light-receiving unit 113, phosphorescence emitted from a banknote irradiated with excitation light from the light source 111. Specifically, as shown in the following Formula (3), phosphorescence emitted from the banknote to be recognized is acquired in the optical sensor (light-receiving unit 113), and the obtained data (phosphorescence signals of the banknote to be recognized) is multiplied by the stored inverse matrix $B(4)^{-1}$, so that output value (corrected phosphorescence signal) related to each single-color ink from which crosstalk is eliminated are calculated. This configuration allows recognition of the four types of single-color inks on the surface A of the banknote. The correction processing unit 11 similarly corrects detection data with correction values, the detection data obtained by receiving, in the light-receiving unit 123, phosphorescence emitted from the banknote irradiated with excitation light from the light source 121. This allows recognition of the four types of single-color inks on the surface B of the banknote.

$$\begin{bmatrix} B' \\ G' \\ R' \\ RGB' \end{bmatrix} = B(4)^{-1} \begin{bmatrix} B \\ G \\ R \\ RGB \end{bmatrix} \quad \text{Formula (3)}$$

Corrected phosphorescence signals = Correction values × Phosphorescence signals of banknote to be recognized A specific example of correction processing executed by the optical sensor 2 of the present embodiment is shown below. Before shipment of the optical sensor 2, phosphorescences respectively emitted from the four types of single-color inks, namely the first single-color ink (B), the second single-color ink (G), the third single-color ink (R), and the fourth single-color ink (IR), are received individually in the light-receiving unit 113 by type of single-color inks to measure the reference emission intensity of each single-color ink. This results in, for example, the output values shown in the following Table 1. The optical sensor 2 of the present embodiment includes no light-receiving element capable of selectively receiving infrared light. Instead, the first light-receiving element 131B, the second light-receiving element 131G, and the third light-receiving element 131R each receive infrared light. Thus, as the output value related to infrared light, an added value of the output values of the first light-receiving element 131B, the second light-receiving element 131G, and the third light-receiving element 131R is calculated. For measurement of the reference emission intensity of each type of single-color ink, phosphorescence is detected by irradiation with excitation light from the light source 111 under the same conditions as in obtaining detection data from the banknote to be recognized.

TABLE 1

| | Single-color ink | | | |
|---|---|---|---|---|
| | First single-color ink (B) | Second single-color ink (G) | Third single-color ink (R) | Fourth single-color ink (IR) |
| Output value of first light-receiving element 131B | 80 | 29 | 8 | 20 |
| Output value of second light-receiving element 131G | 40 | 97 | 35 | 20 |
| Output value of third light-receiving element 131R | 10 | 25 | 159 | 22 |
| Added value of output values of first, second, and third light-receiving elements | 130 | 151 | 202 | 62 |

The results in Table 1 show that the following Formula (4) holds between the light-receiving elements and the single-color inks.

$$\begin{bmatrix} CH\_B \\ CH\_G \\ CH\_R \\ CH\_IR \end{bmatrix} = A(4) \begin{bmatrix} B\_INK \\ G\_INK \\ R\_INK \\ IR\_INK \end{bmatrix} \quad \text{Formula (4)}$$

where $$A(4) = \begin{bmatrix} 80 & 29 & 8 & 20 \\ 40 & 97 & 35 & 20 \\ 10 & 25 & 159 & 22 \\ 130 & 151 & 202 & 62 \end{bmatrix}$$

In the above Formula (4), CH_B represents an output value of the first light-receiving element 131B when the banknote to be recognized is irradiated with excitation light; CH_G represents an output value of the second light-receiving element 131G when the banknote to be recognized is irradiated with excitation light; CH_R represents an output value of the third light-receiving element 131R when the banknote to be recognized is irradiated with excitation light; CH_IR represents an added value of the output values of the first light-receiving element 131B, the second light-receiving element 131G, and the third light-receiving element 131R when the banknote to be recognized is irradiated with excitation light; B_INK represents a phosphorescence signal of the first single-color ink (B) after correction; G_INK represents a phosphorescence signal of the second single-color ink (G) after correction; R_INK represents a phosphorescence signal of the third single-color ink (R) after correction; and IR_INK represents a phosphorescence signal of the fourth single-color ink (IR) after correction.

When the matrix A(4) in the above Formula (4) is normalized, the following Formula (5) holds. In the following Formula (5), the digits after the third decimal place are removed.

$$\begin{bmatrix} CH\_B \\ CH\_G \\ CH\_R \\ CH\_IR \end{bmatrix} = B(4) \begin{bmatrix} B\_INK \\ G\_INK \\ R\_INK \\ IR\_INK \end{bmatrix} \quad \text{Formula (5)}$$

where $$B(4) = \begin{bmatrix} 1 & 0.298 & 0.050 & 0.322 \\ 0.500 & 1 & 0.220 & 0.322 \\ 0.125 & 0.257 & 1 & 0.354 \\ 1.625 & 1.556 & 1.270 & 1 \end{bmatrix}$$

The Formula (5) is transformed, so that the following Formula (6) holds.

$$B(4)^{-1} \begin{bmatrix} CH\_B \\ CH\_G \\ CH\_R \\ CH\_IR \end{bmatrix} = \begin{bmatrix} B\_INK \\ G\_INK \\ R\_INK \\ IR\_INK \end{bmatrix} \quad \text{Formula (6)}$$

where $$B(4)^{-1} = \begin{bmatrix} 1 & 0.298 & 0.050 & 0.322 \\ 0.500 & 1 & 0.220 & 0.322 \\ 0.125 & 0.257 & 1 & 0.354 \\ 1.625 & 1.556 & 1.270 & 1 \end{bmatrix}^{-1}$$

In the above Formula (5) and Formula (6), CH_B, CH_G, CH_R, CH_IR, B_INK, G_INK, R_INK, and IR_INK are the same as in the above Formula (4).

The correction processing is executed in the correction processing unit 11 by arithmetic processing of multiplying the detection data by the inverse matrix $B(4)^{-1}$ as shown in the above Formula (6). The recognition processing using the single-color inks, specifically the authenticity determination processing, is executed in the recognition unit 12 based on the corrected detection data.

The optical sensor 2 of the present embodiment can recognize infrared light using the current structure of the color resists (blue, green, and red color resists). Also, while a conventional optical sensor with a short excitation time may insufficiently excite an infrared ink due to stain/soiling during circulation of banknotes, for example, to cause a low emission intensity, the present embodiment utilizes the feature of a color resist of transmitting infrared light, to obtain a higher infrared signal level. Specifically, since an added value of infrared components transmitted to the first light-receiving element 131B, the second light-receiving element 131G, and the third light-receiving element 131R is used as the signal of infrared light emitted as phosphorescence, the signal level is about three times the actual signal level.

Figure 11:
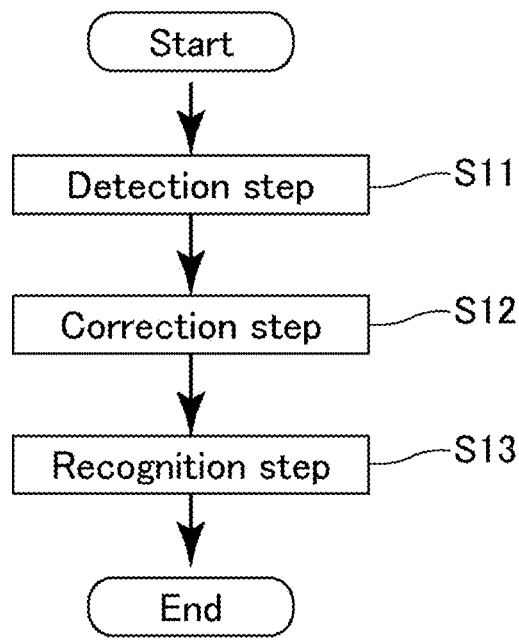
FIG. 11 is a flowchart showing an example of the procedure of processing executed by the banknote recognition unit of Embodiment 2.

Next, with reference to FIG. 11, the procedure of the processing executed in the banknote recognition unit is described.

As shown in FIG. 11, first, the detection unit 20 uses the light-receiving units 113 and 123 each including the first, second, and third light-receiving elements 131B, 131G, and 131R to detect phosphorescence emitted from a banknote BN irradiated with lights from the light sources 111 and 121 (detection step S11).

Next, the correction processing unit 11 corrects the detection data obtained in the light-receiving unit 113 with correction values based on the reference data obtained by receiving phosphorescences emitted from the first single-color ink (B), the second single-color ink (G), the third single-color ink (R), and the fourth single-color ink (IR) individually in the light-receiving unit 113 by type of single-color inks, while correcting the detection data obtained in the light-receiving unit 123 with correction values based on the reference data obtained by receiving phosphorescences emitted from the first single-color ink (B), the second single-color ink (G), the third single-color ink (R), and the fourth single-color ink (IR) individually in the light-receiving unit 123 by type of single-color inks (correction step S12).

Then, the recognition unit 12 executes recognition processing based on the corrected detection data (recognition step S13). For example, the recognition unit 12 determines the presence or absence of the fourth single-color ink (IR) to determine the authenticity based on the presence or absence.

Modified Example 1

In Embodiment 2, the storage unit 30 stores the inverse matrix $B^{-1}$ as correction values. Yet, the storage unit 30 may store the matrix B as correction values. In this case, in the correction processing unit 11, the inverse matrix $B^{-1}$ of the matrix B stored in the storage unit 30 is calculated, and the phosphorescence signals acquired from the banknote to be recognized are multiplied by the inverse matrix $B^{-1}$. This allows recognition of infrared light emitted from the fourth single-color ink (IR).

Modified Example 2

In Embodiment 2, the storage unit 30 stores the inverse matrix $B^{-1}$ as correction values. Yet, the storage unit 30 may store the matrix A as correction values. In this case, in the correction processing unit 11, the matrix B is calculated from the matrix A stored in the storage unit 30, and the inverse matrix $B^{-1}$ of the matrix B is calculated, so that the phosphorescence signals acquired from the banknote to be recognized are multiplied by the inverse matrix $B^{-1}$. This allows recognition of infrared light emitted from the fourth single-color ink (IR).

Modified Example 3

In Embodiment 2, the storage unit 30 stores the inverse matrix $B^{-1}$ as correction values. Yet, the storage unit 30 may not store the above matrix and may store as correction values an expansion of calculation using the above matrix. Specifically, the storage unit 30 may store an expansion of the above Formula (3) or Formula (6). In this case, in the correction processing unit 11, the phosphorescence signals acquired from the banknote to be recognized are substituted into the expansion. This allows recognition of infrared light emitted from the fourth single-color ink (IR).

Modified Example 4

In Embodiment 2, infrared light emitted from the fourth single-color ink (IR) is recognized based on detection data obtained using all the first, second, and third light-receiving elements 131B, 131G and 131R capable of receiving infrared light. Yet, it is not necessary to employ detection data obtained using all the first, second, and third light-receiving elements 131B, 131G, and 131R. Infrared light can be recognized based on detection data obtained using two or more types of light-receiving elements. For example, infrared light may be recognized based on detection data obtained using two types of light-receiving elements, namely the second and third light-receiving elements 131G and 131R. In this case, an added value of infrared light components received in the second and third light-receiving elements 131G and 131R is taken as the infrared light component, so that the signal level related to infrared light is about twice the actual signal level.

Modified Example 5

In Embodiments 1 and 2, cases of detecting single-color lights emitted from single-color inks are described. An optical sensor of the present disclosure can also detect mixed-color lights each emitted from a combination ink of two or more single-color inks. Specifically, in a case of a mixed-color ink in which single-color inks of two colors are mixed, correction with any of the above correction values results in the output values of two types of single-color inks corresponding to the above single-color inks of two colors left, with the output values of the other single-color inks disappeared.

Modified Example 6

In Embodiment 2, the case is described where light commonly received in the light-receiving elements of different colors is infrared light. The light to be commonly received in the light-receiving elements of different colors is not limited to infrared light.

Modified Example 7

In Embodiment 2, infrared light is recognized through the correction processing executed using a matrix including as a matrix element an added value of infrared light components received in the first, second, and third light-receiving elements 131B, 131G, and 131R. Yet, the correction processing may be executed using a matrix without an added value of infrared light components as a matrix element. For example, a matrix including blue light, green light, and red light components received in the above three types of light-receiving elements as matrix elements may be used to correct a visible reflection image obtainable by irradiating a banknote with light from a white light source, so that the color balance can be adjusted.

Modified Example 8

In Embodiment 2, phosphorescence emitted from a banknote is detected. Yet, fluorescence emitted from a banknote may be detected, or phosphorescence and fluorescence emitted from a banknote may each be detected, and the detected phosphorescence signal and fluorescence signal may each be subjected to the correction processing.

As descried above, the embodiments of the present disclosure have been described with reference to the drawings. The present disclosure is not limited to these embodiments. The structures of the embodiments may be combined or modified as appropriate within the spirit of the present disclosure.

As described above, the present disclosure provides a technique useful in recognizing light having a wavelength band receivable in a plurality of types of light-receiving elements.

What is claimed is:

1. An optical sensor that detects light from a sheet on which is printed at least one type of single-color ink among first to n-th n types of single-color inks that emit lights having wavelength bands different from one another, wherein n is an integer of 3 or greater, the optical sensor comprising:
   a light source;
   a light receiver including first to (n-1)th light-receiving elements respectively capable of selectively receiving lights emitted from the first to (n-1)th single-color inks among the first to n-th single-color inks and capable of receiving light emitted from the n-th single-color ink;
   a memory configured to store a correction value based on reference data obtained by receiving lights emitted from the first to n-th single-color inks individually in the light receiver by type of single-color inks; and
   a controller configured to correct detection data with the correction value, the detection data obtained by receiving, in the light receiver, light emitted from a sheet irradiated with light from the light source, wherein
   the correction value is based on a matrix A with n rows and n columns represented by the following Formula (1):

$$A = \begin{bmatrix} A_{11} & \cdots & A_{1n} \\ \vdots & \ddots & \vdots \\ A_{(n-1)1} & \cdots & A_{(n-1)n} \\ \sum_{i=1}^{n-1} A_{i1} & \cdots & \sum_{i=1}^{n-1} A_{in} \end{bmatrix} \quad \text{Formula (1)}$$

where a matrix element $A_{xy}$ is an output value of an x-th light-receiving element when light emitted from a y-th single-color ink among the first to n-th single-color inks is received alone in the light receiver, x is an integer of 1 or greater and (n−1) or smaller, and y is an integer of 1 or greater and n or smaller.

2. The optical sensor according to claim 1, wherein the correction value is based on a normalized matrix of the matrix A represented by the Formula (1).

3. The optical sensor according to claim 2, wherein the correction value is based on an inverse matrix of the normalized matrix.

4. The optical sensor according to claim 2, wherein the normalized matrix is obtained by calculation including dividing each matrix element in a y-th column of the matrix A by a matrix element in a y-th row and the y-th column of the matrix A.

5. The optical sensor according to claim 1, wherein
   n is 4,
   light emitted from a first single-color ink has a peak wavelength of 400 nm or longer and shorter than 500 nm,
   light emitted from a second single-color ink has a peak wavelength of 500 nm or longer and shorter than 600 nm,
   light emitted from a third single-color ink has a peak wavelength of 600 nm or longer and shorter than 750 nm, and light emitted from a fourth single-color ink has a peak wavelength of 750 nm or longer and shorter than 2500 nm.

6. A sheet recognition unit comprising the optical sensor according to claim 1.

7. A sheet handling device comprising the sheet recognition unit according to claim 6.

8. A light detection method of detecting light from a sheet on which is printed at least one type of single-color ink among first to n-th n types of single-color inks that emit lights having wavelength bands different from one another, wherein n is an integer of 3 or greater, the light detection method comprising:
- a detection step of obtaining detection data by receiving light emitted from a sheet irradiated with light from a light source in a light receiver including first to (n−1)th light-receiving elements respectively capable of selectively receiving lights emitted from the first to (n−1)th single-color inks among the first to n-th single-color inks and capable of receiving light emitted from the n-th single-color ink; and
- a correction step of correcting the detection data with a correction value based on reference data obtained by receiving lights emitted from the first to n-th single-color inks individually in the light receiver by type of single-color inks, wherein the correction value is based on a matrix A with n rows and n columns represented by the following Formula (1):

$$A = \begin{bmatrix} A_{11} & \cdots & A_{1n} \\ \vdots & \ddots & \vdots \\ A_{(n-1)1} & \cdots & A_{(n-1)n} \\ \sum_{i=1}^{n-1} A_{i1} & \cdots & \sum_{i=1}^{n-1} A_{in} \end{bmatrix} \quad \text{Formula (1)}$$

where a matrix element $A_{xy}$ is an output value of an x-th light-receiving element when light emitted from a y-th single-color ink among the first to n-th single-color inks is received alone in the light receiver, x is an integer of 1 or greater and (n−1) or smaller and y is an integer of 1 or greater and n or smaller.

* * * * *